United States Patent [19]

Howerton et al.

[11] Patent Number: 4,534,437
[45] Date of Patent: Aug. 13, 1985

[54] SNOW TRACK BELT FOR MOTORCYCLE

[75] Inventors: Anderson W. Howerton, Christian County; James A. Lewis, Springfield, both of Mo.

[73] Assignee: Dayco Corporation, Dayton, Ohio

[21] Appl. No.: 530,818

[22] Filed: Sep. 9, 1983

[51] Int. Cl.³ .......................................... B62M 27/02
[52] U.S. Cl. .................................. 180/185; 180/198; 305/20; 305/35 EB
[58] Field of Search ............. 180/185, 198; 305/6, 305/13, 15, 20 R, 35 EB

[56] References Cited

U.S. PATENT DOCUMENTS

| | | | |
|---|---|---|---|
| 1,611,829 | 12/1926 | Freedlander . | |
| 1,828,136 | 10/1931 | Freedlander . | |
| 2,812,081 | 11/1957 | Schrader | 180/198 |
| 3,050,347 | 8/1962 | Levi | 305/20 |
| 3,464,875 | 9/1969 | Brooks et al. | 156/138 |
| 3,498,684 | 3/1970 | Hallaman | 305/38 |
| 3,747,995 | 7/1973 | Russ, Jr. | 305/35 EB |
| 3,756,091 | 9/1973 | Miller | 74/231 |
| 3,883,191 | 5/1975 | Chaumont | 305/35 R |
| 3,885,641 | 5/1975 | Harris | 180/185 |
| 3,887,243 | 6/1975 | Chaumont | 308/24 |
| 3,924,481 | 12/1975 | Gregg | 74/231 C |
| 4,037,485 | 7/1977 | Huback | 74/229 |
| 4,106,966 | 8/1978 | Brooks | 156/138 |

Primary Examiner—Joseph F. Peters, Jr.
Assistant Examiner—Donn McGiehan
Attorney, Agent, or Firm—Joseph V. Tassone; David E. Wheeler

[57] ABSTRACT

An endless traction belt and a method for its manufacture are provided. The traction belt has a main body made primarily of elastomeric material and is adapted to be moved in an endless path having a longitudinal axis. The main body comprises a substantially smooth inner surface and a ground engaging outer surface having a plurality of traction increasing portions or teeth. The teeth also act as sprocket engaging means for driving the belt.

20 Claims, 6 Drawing Figures

SNOW TRACK BELT FOR MOTORCYCLE

BACKGROUND OF THE INVENTION

This invention relates to an endless flat-type traction belt for a ski attachment for motorcycles, and in particular to a flat-type traction belt on which the traction means also serves as a sprocket engaging means for driving said belt.

The primary object of the present invention is to provide a traction belt which can be used on a ski attachment for motorcycles, similar to that described by Harris in U.S. Pat. No. 3,885,641. The ski attachment for which the belt of the present invention may be used, comprises skis that are adapted to be conveniently attached to a motorcycle to support it for movement over snow surfaces. When used as a ski attachment, the attachment comprises two main parts; a single ski which is attached to the front wheel of the motorcycle, which permits the front wheel, while stationary, to slide over the snow; and a driving device for connection to the rear wheel of the motorcycle which may comprise two skis on either side of the device for balance, and an endless traction belt for providing driving contact with the terrain. The driving device utilizes the driving, or rear wheel of the motorcycle to provide the driving force for the attachment. The belt of the present invention provides traction and utilizes the driving force of the motorcycle to drive the ski attachment.

In the ski attachment taught by Harris, propulsion of the motorcycle is provided by contacting the drive wheel of the motorcycle with two sprockets which tangentially contact a driving chain attached to the traction belt. This can be seen in FIG. 5 in the Harris patent. When sprocket 44 contacts the chain 50 directly over roller 48, this configuration, because of the small surface area of contact, and because of the extreme pressures applied on the points of contact, causes the driving chain to wear out quickly. Also, because of the small area of contact between the sprocket and the belt, a certain amount of slippage in the drive system is possible.

The belt construction used by Harris, where a driving chain is attached to the belt is expensive in terms of materials and labor needed to provide such construction. Also, such construction has the disadvantage that separation of the driving chain from the belt can and does occur.

A number of belt driving systems are known in the art, none of which are suitable for application to a motorcycle ski adapter kit.

Chaumont, U.S. Pat. No. 3,887,243 relates to an endless track that is adapted to be used on motor driven vehicles such as tractors, snowmobiles, etc. In the belt described by Chaumont, the sprockets for driving the belt are located on the inside of the track and make driving contact with the top of the belt. Since the traction part of the belt is the bottom of the belt, the driving portion of the belt in Chaumont is separated from the traction portion of the belt.

Freedlander, U.S. Pat. No. 1,828,136 teaches a pulley and a belt having matched teeth used as a driving force. In the pulley and belts taught by Freedlander, the driving force is applied to the inside, or the top of the belt.

Freedlander, U.S. Pat. No. 1,611,829 teaches a driving belt, designed particularly as a fan belt for use in automobiles. The belt taught by Freedlander has a central member composed of rubberized cord fabric cut straight or parallel to the reinforcement cords and in a pre-stretched condition. The tension member of the belt comprises a rubberized fabric cut on the bias, or at an angle, and in a pre-stretched condition. Accordingly, the belt is non-stretchable.

Hallaman, U.S. Pat. No. 3,498,684 teaches a traction belt having lugs on its outer surface and tension cords, made of inextensible but flexible wire cord, embedded in the belt, to provide increased transverse stiffness. Longitudinal tension resisting members 10c are positioned centrally through the thickness of the belt in a closely spaced parallel relationship.

Chaumont, U.S. Pat. No. 3,883,191 teaches an endless track which has a main body made primarily of an elastomeric material which is adapted to be moved in an endless path having a longitudinal axis. The main body comprises an inside surface and a ground engaging surface. The inside surface at 15 is provided with projections 17 which are adapted to be engaged by a cooperating pair of inside drive sprockets.

It is recognized in the art to provide a toothed power transmission belt wherein the teeth have a cross sectional configuration of generally trapezoidal form with a radius between the shorter base of the trapezoid and the angled face, wherein the space between the teeth is at least equal to the major base of the trapezoid and the teeth are for mating with conjugating pulley teeth.

It is also known in the art to provide a toothed power transmission belt wherein the teeth have a cross-sectional configuration composed of two circular intersecting arcs for meshing with mating conjugate curvilinear pulley teeth, for example see U.S. Pat. No. 3,756,091 issued to Miller.

It is also known in the art to provide a toothed power transmission system wherein the dimensional relationship of the belt teeth and the grooves and the pulley teeth and grooves is such that in the longitudinal extent of the belt between the pulleys the height of the belt teeth is greater than the depth of the pulley grooves while as the belt travels around the pulleys, the extremely outwardly facing portions of the belt teeth which confront the pulleys come into contact with the portions of the toothed pulley disposed between the pulley teeth which define the bottoms of the pulley grooves, for example, see U.S. Pat. No. 4,037,485 to Huback. In this case, the meshing of the belt teeth is not of the conjugate form.

The above mentioned art specifically teaches that the toothed power transmission belts are constructed on a precisely defined right circular cylinder wherein the mutually cooperating neutral axis plane is established by said right circular cylinder. The toothed power transmission belts of the prior art are primarily intended to be used for power transmission from one toothed pulley to another toothed pulley.

Accordingly, a need exists in the art for a special flat-type traction belt with a dual purpose toothed surface capable of being driven by toothed sprockets and also provide vehicular propulsion. In particular, a need exists for a special flat-type traction belt with a dual purpose toothed surface capable of being driven by toothed sprockets for use with an adapter kit that is used to convert a motorcycle from a street or highway machine to a multi-terrain, all-weather machine with an emphasis on snow transportation.

Accordingly, it is an object of this invention to provide a special flat type traction belt with a dual purpose toothed surface capable of being driven by two toothed sprockets and also provide traction for vehicular propulsion for multi-terrain.

A further object of this invention is to provide a flat-type traction belt as described above for use with a quick adapter kit that converts a motorcycle from a street or highway machine to a multi-terrain all-weather machine with emphasis on snow transportation.

A further object of this invention is to provide a special flat-type traction belt which is highly abrasion resistant, and has a high tear strength.

A further object of this invention is to provide a flat-type traction belt which is relatively light in weight yet demonstrates great strength and flexibility.

A further object of this invention is to provide a traction belt as described which is inexpensive to build.

Further objects of this invention will become apparent from the following specification and claims.

SUMMARY OF THE INVENTION

This invention provides an endless flat-type track or belt particularly adapted to be used with an adapter kit or ski attachment which converts motorcycles, or similar vehicles, from a street or highway machine to a multi-terrain, all-weather machine with emphasis on snow transportation.

The present invention provides an endless track that has a smooth top or inner surface that is adapted to contact non-driving rollers. The belt has a bottom or outer surface having a plurality of traction increasing teeth which also serve as engaging means for engaging the teeth of driving sprockets. The belt is abrasion resistant, and demonstrates high tear strength.

More particularly, the present invention provides an endless flat-type traction belt for a ski attachment for motorcycles having a main body made of an abrasion resistant, high tear strength elastomeric material. The traction belt of the invention is adapted to be moved in an endless path along a longitudinal axis. The main body of the belt comprises a substantially smooth inner surface and a ground engaging outer surface having the plurality of traction increasing portions. The traction increasing portions of the belt also act as sprocket engaging means for driving the belt. The traction increasing portions of the belt comprise deep teeth having a substantially uniform tooth pitch—the top or inner surface being relatively thin and flexible.

The present invention further provides a method of making an endless flat type traction belt for a ski attachment for motorcycles comprising the steps of forming a base ply inner surface, forming a ground engaging outer surface, forming a plurality of traction portions on said outer surface, and embedding a plurality of reinforcing members in the outer surface. The method further includes the steps of forming the traction portion in the form of deep teeth adapted to act as sprocket engaging means, and the step of embedding the plurality of reinforcing members parallel to the longitudinal axis. The method also provides for forming the deep teeth on the belt to comprise 60–75 percent of the total belt thickness.

Other details, uses, and advantages of this invention will become apparent from the following description in the specification, drawings, and the claims.

DETAILED DESCRIPTION OF THE PREFERRED EMBODIMENTS

Figure 1:
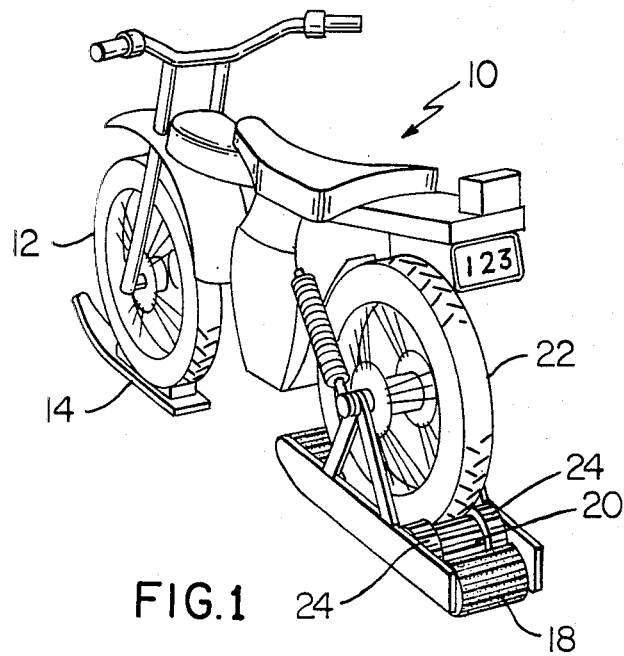
FIG. 1 illustrates a ski adapter kit attached to a motorcycle.

FIG. 1 illustrates a ski attachment attached to a motorcycle. The front wheel 12 of the motorcycle 10 is fixedly attached to ski 14. Rear wheel 22 of the motorcycle 10 provides the driving force for the ski attachment. The driving force of the rear wheel 22 is transferred through two toothed metal hubs 20, and through plastic sprockets 24 to the traction belt 18. When used on terrain other than snow, the adapter kit will be used without the ski.

Figure 2:
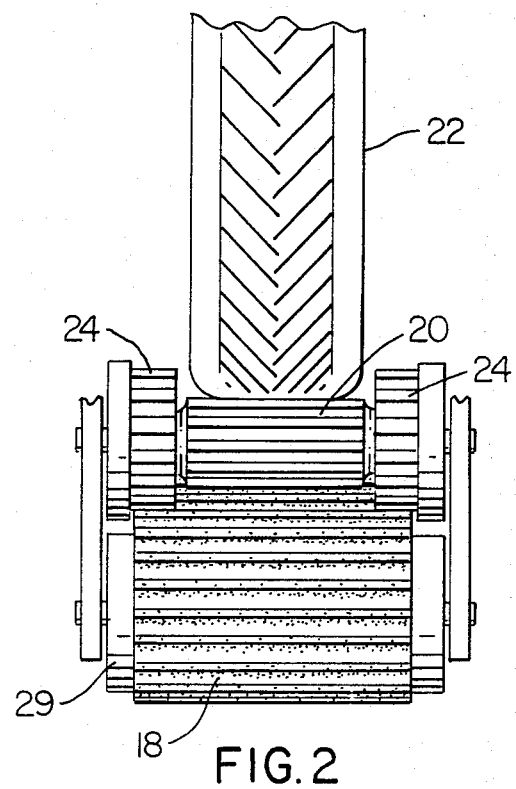
FIG. 2 illustrates a rear view looking forward of the back wheel of the motorcycle in contact with the driving portion of the ski adapter kit.

FIG. 2 is a rear view looking forward of the rear wheel 22 of the motorcycle, making contact with a toothed metal hub wheel 20 of the ski adapter kit. The toothed metal hub wheel 20 does not contact the traction belt 18, but is connected to plastic sprockets 24 on either side of the hub wheel 20, and plastic sprockets 24 engage the traction belt 18.

Figure 3:
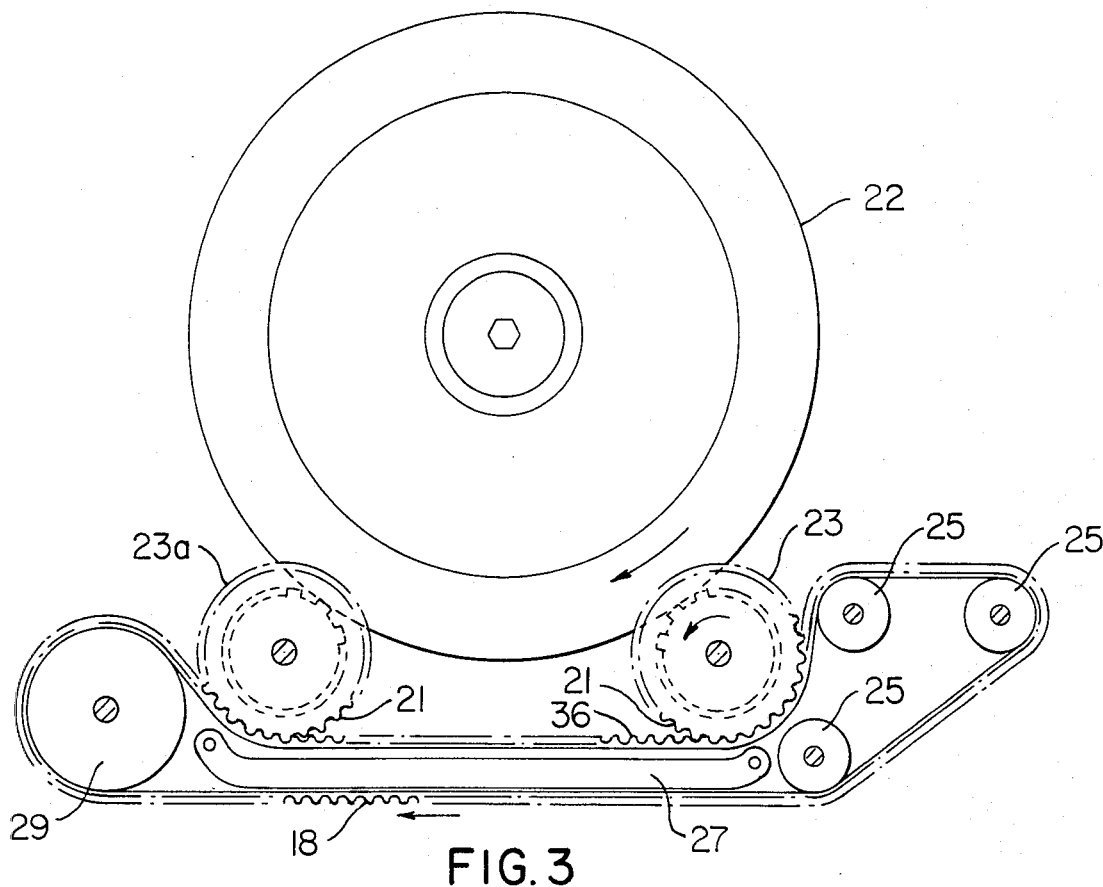
FIG. 3 illustrates a side view of the rear cycle wheel making contact with two toothed metal hubwheels, and illustrates the endless belt path for the driving portion of the ski adapter kit.

FIG. 3 is a side view of the rear wheel 22 of the motorcycle making contact with the driving portion in the ski adapter kit. For convenience, the same numbers will be used throughout the drawings to define the different illustrations of the same features of the invention.

In FIG. 3 the cycle wheel 22 makes contact with the forward toothed metal hub wheel and sprockets 23, and the aft metal hub wheel and sprocket 23a, which in turn make contact with the traction belt 18. The elements 23 and 23a are a general representation of the elements 20 and 24 in FIGS. 1 and 2. FIG. 3 also illustrates the endless belt path of the traction belt. During its driving operation, the cylcle wheel 22 will be moving in a clockwise direction. The toothed metal hub and sprocket 23 will move in a counterclockwise direction, which in turn will propel the traction belt in a clockwise direction over the three 2-inch pulleys 25 and around the flat pulley 27 and over the large aft pulley 29.

Figure 4:
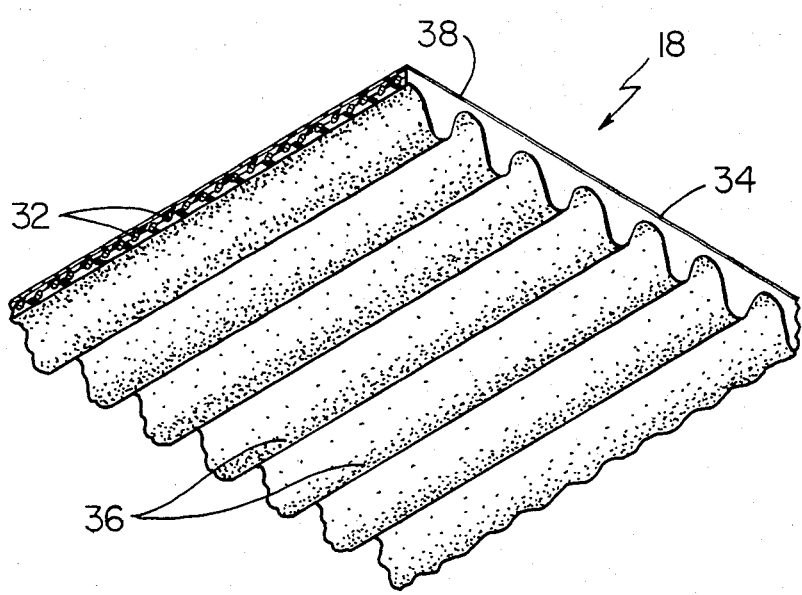
FIG. 4 illustrates an elevated, slightly angled view of a cutaway portion of the traction belt of the invention.

FIG. 4 is an elevated, side angle view of a cutaway portion of the traction belt of the invention noted generally as 18. A plurality of reinforcing members 32 are embedded in the main body of the traction belt extending parallel to the longitudinal axis. The two layers of base ply 34 can be seen from both the front and the side of the cutaway portion of the belt. The traction increasing portion or teeth 36 provide traction contact with the ground as well as tooth engaging means with the driving sprockets. Surface 38 is substantially smooth so as to roll easily over the pulleys of the adapter.

Figure 5:
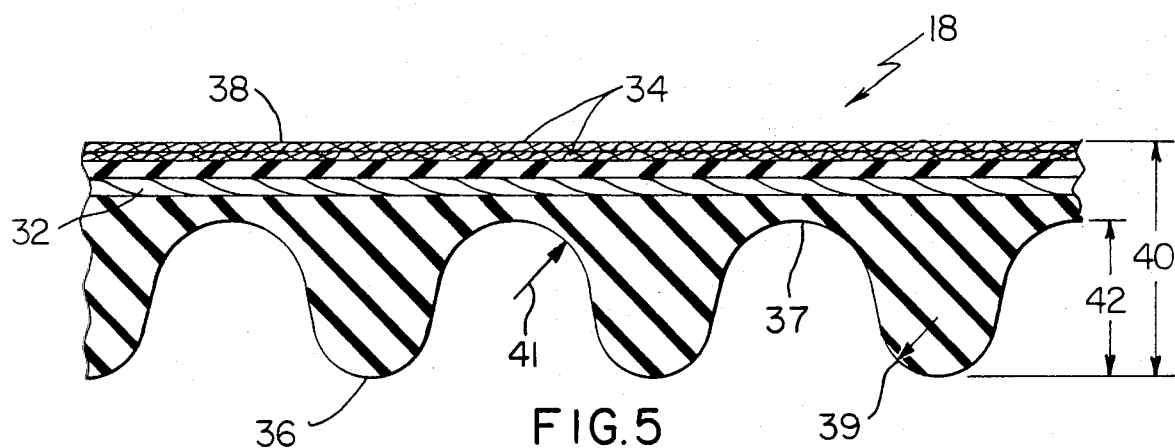
FIG. 5 illustrates a cutaway side view of the traction belt of the invention.

FIG. 5 is a side angle view of the traction belt 18 further illustrating the reinforcing cord 32, the base plies 34, the teeth 36, and the top surface 38. The teeth 36 will generally have a depth 42 which will represent 60–75 percent of the total belt thickness 40.

Figure 6:
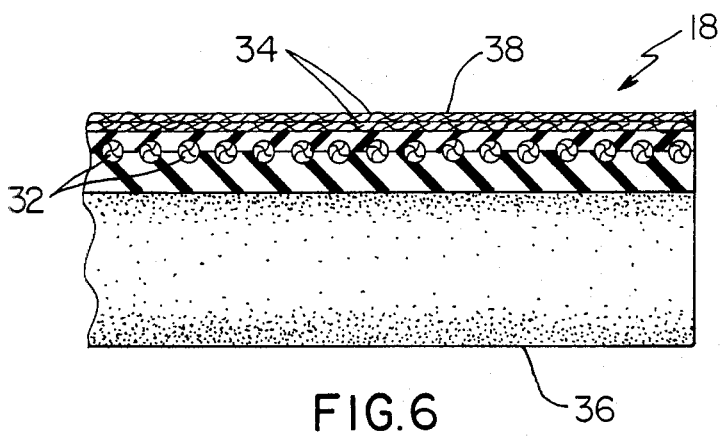
FIG. 6 illustrates a cutaway front view of the traction belt of the invention.

FIG. 6 is a front view cross section of the traction belt 18. In this figure, the reinforcing members or cords 32 are illustrated as being single, independent elements perpendicular to the plane of the drawing. For suitable flexibility and strength, it has been found that it is preferred to have 18-22 reinforcing members per inch of belt.

As can be seen from the drawings, the toothed metal hub wheel 20 never makes contact with the traction belt 18. Referring to FIG. 3, the toothed metal hubwheel 20 is fixedly attached to plastic sprockets 24 which have teeth 21 which generally match the traction increasing portion or teeth 36 of the traction belt. Referring to FIG. 2, the rear cycle wheel makes contact with the metal hub wheel 20 generally in the middle portion of the driving device. The plastic sprockets 24 are disposed at either end of the metal hub wheel 20 and make contact with the traction belt 18 at the edges thereof.

It is preferred that the traction portions, or teeth of the belt, because of the inherent flexibility of the elastomer be substantial. This is preferred since the teeth of the belt engage the teeth of the plastic sprockets to provide the driving force of the belt, and the driving force of the sprockets would be dissipated if the teeth of the belt are too flexible. Those skilled in the art will be able to determine optimum teeth sizes for a specific use using methods well known in the art. For the purposes of the present invention, it is preferred that the width of the teeth, as measured at the midpoint thereof, represent about 5/12 to ½ the pitch, the traction belt will have about 6 teeth for each 3½ inch longitudinal portion of the belt.

More particularly, the belt of the invention for its use with a motorcycle adapter kit, has teeth 36 and the grooves 37 therebetween composed of a single radius 39 at the bottom of the tooth 36 and another single radius 41 at the top of the groove such that the width of the tooth 36 at the center of the tensile member 32 is not greater than the width of the groove 37 at the center of the tensile member. The depth 42 of the tooth 36 is substantially greater than radius 39 and in particular the radius 39 is generally less than 50 percent of the depth 42 of the tooth 36. Specifically, the radius 39 of the tooth 36 is approximately 7/64 inches and the radius 41 of the groove 37 is approximately 5/32 inches while the pitch of the teeth 36 is approximately 0.630 inch and the depth 42 of the teeth 36 is approximately 0.320 inch.

The metal hub wheel and sprocket 23 is provided with teeth 21 which engage the grooves 37 of the belt of the present invention. The grooves between the teeth 21 of the metal hub wheel and sprocket 23 are of sufficient depth that the radius 39 of the teeth 36 does not engage the bottom of the grooves between the teeth 21 of the pulley 23.

Although the belt of the present invention functions, to a large extent, as a synchonous belt, one of the advantages of the present invention is that the precise tolerances of a synchronous belt are not required because of the flexibility of the traction belt as made herein. Accordingly, the great expense encountered in producing a synchronous belt, because, for example, a synchronous belt needs to be formed on a precision tooled metal drum, are avoided. In particular, the teeth 21 of the metal hub wheel and sprocket 23 were not generated as a conjugate form but were produced by projecting the form of the tooth 36 onto the pulley 23 when the belt 18 is bent around a radius of 2.5" at the top of the grooves 41 of the belt 18. Therefore, it must be appreciated that as the teeth 36 of the belt 18 contact the ground in order to provide tractive motion thereto, the teeth 36 will become worn at the bottom of the tooth 36 and the tooth engagement must rely solely upon engagement of the teeth 21 of the metal hub wheel and sprocket 23 in the grooves 37 of the belt 18.

A metal hub wheel is preferred since metals are generally long-wearing materials. It will be recognized by those skilled in the art that other long wearing materials may be used.

The sprockets 24 may be made of any long-wearing material. Plastic sprockets are preferred since the materials are relatively inexpensive and the expense and labor of machining and precision tooling the sprockets is avoided.

As can be seen in FIG. 3, the specific configuration of the traction belt on the rollers makes possible a large contact area between the sprockets and the traction belt. Thus, by using oversized aft roller 29 and flat roller 27, an arc of approximately 80° to 110° of contact with the aft metal hub wheel and sprocket 23a is possible. By using the three two inch rollers in conjunction with the flat roller, an arc of approximately 100° to 160° of contact with the forward metal hub wheel and sprocket 23 is possible. Since there is a large area of contact between the driving sprockets and the traction belt, the driving force is distributed over a large area and this correspondingly reduces the amount of wear on the sprockets and the traction belt. Also, because of the large contact area, there is less chance of the belt slipping.

Any suitable elastomeric material can be used for the main body of the belt. By any suitable material, it is meant that the elastomeric material will be abrasion resistant, and demonstrate a high tear strength. Preferably, the main body of the belt will be made from an abrasion resistant, high tear strength rubber stiflex.

Stiflex refers to a rubber composition commonly used in the driving belt art in which discrete minute fibers are incorporated within the rubber stock to stiffen the rubber. The use of stiflex is illustrated in, for example, U.S. Pat. Nos. 1,611,830, 1,700,999 and 3,416,383. In general, the minute fibers are oriented perpendicular to the longitudinal axis, or transversely, in the belt. In particular, the stiflex used in the present invention may contain from 5-50 phr of fibers.

Examples of the elastomer used for the main body of the belt are neoprene, styrene butadiene rubber, natural rubber, polyurethane and polybutadiene rubber. The preferred elastomer is neoprene.

Those skilled in the art will recognize that since polyurethane is handled differently from the other elastomers mentioned, that a belt made of polyurethane will not be made by the method described herein. Other conventional methods for building belts, known in the art, however, may be employed using polyurethane.

Because the belt is required to turn over three 2-inch rollers in the driving system, a high degree of flexibility is needed. Accordingly, it has been found that to achieve this flexibility without sacrificing traction, a belt which has substantial traction increasing portions which are also used as teeth to engage driving sprockets, and a top that is relatively thin with respect to the total thickness of the belt must be used. Accordingly, the top or inner surface of the belt of the invention represents from 25-40 percent of the total belt thickness. It has been found that a belt thickness of about 0.480 inch with a tooth depth of about 0.320 inch is preferable. Thus, the flexible surface of the belt will have a thickness of about 0.160 inch. Preferably, the traction belt of the invention will have sufficient flexibility to bend with an arc of about 170° over a 2 inch roller. In most cases, however, the belt will have sufficient flexibility if it can bend over a 120° to 150° arc of a two inch roller. It is most preferred that the traction belt have substantially more flexibility than is minimally required to operate on the required belt path of the adapter kit.

Also, since the traction increasing portion or teeth of the belt are adapted to engage the teeth of the driving sprockets, it is required that the teeth on the traction belt have a substantially uniform tooth pitch so that smooth engagement with the driving sprockets can be made.

In its operation, depending on the size of the motorcycle and the ski adapter kit used, the belt of the present invention will provide about 98 to 200 sq. inches of track area contact with the terrain. In general, the belt will have a width of about 5–9 inches, preferably 6–7 inches, and a length or circumference of about 60–120 inches, preferably 60–100 inches.

As a design option, the traction belt may be provided with holes adapted to facilitate smooth discharge of foreign materials such as snow.

Also, as a design option, additional traction patterns may be provided. For example, longitudinal cuts may be provided in the transverse traction portions, or longitudinal ridges may be provided to help prevent sideways slide or "fishtailing".

The reinforcing members or cord may be made of any material having sufficient flexibility and strength and compatibility with the elastomeric material used. Examples of such material used for the cord are polyester, aramid, glass fiber, rayon, steel cord or steel, and fiber cord. The preferred material used in the cord is polyester.

The base ply may be formed from any suitable fabric material which has sufficient flexibility and strength for the purpose used as well as compatibility with the elastomeric material used. Examples of materials used in the fabric layer are nylon, polyester, cotton, aramid, and mixtures thereof. The preferred fabrics used in the ply are a polyester-cotton blend.

The method of construction of the belt 18 is similar to the assignee's issued U.S. Pat. No. 3,464,875 which is incorporated herein by reference. The prinicpal difference in construction of the belt 18 as opposed to the herein reference patent is that the belt 18 is not intended for side driving forces and therefore is made thinner in overall height 40 and therefore the depth 42 of the teeth 36 as a ratio to the overall thickness 40 is somewhat reduced. In particular this ratio of the present invention should be substantially ⅔. Thus, the belt of the present invention is made by applying layers of rubber, to the desired thickness, to a hollow drum having a grooved butyl rubber matrix on the outside surface thereof, the rubber matrix having the desired shape for the traction portions. The reinforcing cord is helically and tightly wound around the first rubber layers, compressing the rubber into the grooved matrix to form the shape of the traction portions.

When polyester cord is used, the cord will contract when curing temperatures are applied, compressing the rubber into the matrix even further.

The fabric plies are then applied over the reinforcing cord.

The drum with the belt construction is then placed in a heating pot and subjected to a differential steam pressure cure. The outside of the drum will be maintained under about 8-11 atmospheres pressure while the center of the drum will be maintained at about 4-7 atmospheres. Cure time is between ½ to 1½ hours. The belt construction is then cooled, removed from the matrix, and inverted to put the teeth on the outside of the belt.

The length of the belt 18 is sufficiently long to permit the belt 18 to be turned upon itself to provide the teeth 36 on the exterior of the belt 18. Of course, it will be apparent to those skilled in the art to provide a belt 18 which was manufactured in its upright position upon a flat drum and the teeth 36 provided upon the exterior of the belt 18 by the method of providing a top cog belt disclosed in the assignees previously issued U.S. Pat. No. 4,106,966, incorporated herein by reference.

As will be apparent to those skilled in the art, the above description and examples are merely illustrative of the present invention. Other parameters and permutations of the invention may be used without departing from the inventive concept herein. It is intended that the present invention be limited only by the scope of the appended claims.

What is claimed is:

1. In an endless flat-type traction belt for a driving attachment for motorcycles having a main body made of an abrasion resistant, high tear strength elastomeric material and being adapted to be moved in an endless path along a longitudinal axis, said main body comprising a substantially smooth inner surface and a ground engaging outer surface having a plurality of traction increasing portions thereon, the improvement wherein said belt has flexibility sufficient to at least flex over a 2 inch diameter roller, said traction increasing portions comprise deep teeth which have a depth comprising 60–75% of the total belt thickness, said traction increasing portions being adapted for acting as a sprocket engaging means for driving said belt, said deep teeth having a substantially uniform tooth pitch, and said belt having a smooth thin flexible inner surface.

2. An endless belt as set forth in claim 1 in which said belt has a thickness of 0.400–0.560 inch and a tooth depth of 0.0240–0.420 inch.

3. An endless belt as set forth in claim 1 in which said belt has a thickness of 0.480 inch and a tooth depth of 0.320 inch.

4. An endless belt as set forth in claim 1 in which 98 to 200 square inches of track area contacts the terrain.

5. An endless belt as set forth in claim 1 in which holes are formed, said holes being adapted to facilitate discharge of foreign materials.

6. An endless belt as set forth in claim 1 in which said elastomer is an abrasion resistant, high tear strength rubber containing fibers therein.

7. An endless belt as set forth in claim 1 having a base ply comprising two fabric plies, and a plurality of reinforcing members embedded in said main body and extending parallel to the longitudinal axis thereof.

8. An endless belt as set forth in claim 6 in which the reinforcing members are at least one independent strand of at least one cord, helically wound around said belt.

9. An endless belt as set forth in claim 7 in which there are 18–22 reinforcing members per inch of belt.

10. An endless belt as set forth in claim 7 in which the cord material is selected from the group consisting of polyester, aramid, glass fiber, rayon, steel cord and steel fiber cord.

11. An endless belt as set forth in claim 8 in which the cord material is polyester.

12. An endless belt as set forth in claim 6 in which the fabric layers are selected from nylon, polyester, cotton, aramid and mixtures thereof.

13. An endless belt as set forth in claim 10 in which the fabric layers are a polyester cotton blend.

14. An endless belt as set forth in claim 1 in which the elastomer is selected from the group consisting of neoprene, styrene-butadiene rubber, natural rubber, polyurethane and polybutadiene rubber.

15. An endless belt as set forth in claim 1 in which the elastomer is neoprene.

16. In a method of making an endless flat type traction belt for a ski attachment for motorcycles comprising the steps of forming a base ply inner surface, forming a ground engaging outer surface, forming a plurality of traction portions on said outer surface, embedding a plurality of reinforcing cords in said outer surface, in which the improvement comprises the steps of forming said traction portions in the form of deep teeth traversing the belt perpendicular to the longitudinal axis thereof, said teeth being adapted to act as sprocket engaging means, disposing fibers oriented perpendicular to the longitudinal axis of the belt in the rubber stock comprising said deep teeth to stiffen the rubber transversely in the belt, embedding said plurality of reinforcing cords parallel to said longitudinal axis, and forming said deep teeth to comprise 60–75 percent of the total belt thickness.

17. A method as set forth in claim 16 in which said belt has a thickness of 0.400–0.560 inch and a tooth depth of 0.240–0.420 inch.

18. A method as set forth in claim 16 in which said belt has a thickness of 0.480 inch and a tooth depth of 0.320 inch.

19. A method as set forth in claim 16 in which the reinforcing members are embedded with a density of 18–22 reinforcing members per inch.

20. In a combination of a motorcycle and a driving adapter, in which the motorcycle provides the driving force for said adapter by transferring the force of the driving wheel thereof through sprockets to a traction belt on said driving adapter, in which the improvement comprises a traction belt having traction means that serve as sprocket engaging deep teeth for driving said belt; said deep teeth comprising 60–75% of the total thickness of the belt and having a substantially uniform tooth pitch, tolerance for said tooth pitch being broader than normally required for a synchronous belt; and a smooth, thin, and flexible inner surface.

* * * * *